Patented July 20, 1954

2,684,302

UNITED STATES PATENT OFFICE 2,684,302

PROCESS OF PRODUCING CRULLERS FROM WHEAT FLOUR

Abraham Kipnis, Forest Hills, N. Y.

No Drawing. Application May 12, 1953,
Serial No. 354,649

1 Claim. (Cl. 99—92)

This invention relates to an improved method of producing a prepared flour for use in making pastries such as French crullers, cream puffs and eclairs.

In the past the preparation of pastries of this nature was both time-consuming and tedious, for it was necessary to precook wheat flour and thereafter cool it below cooking temperatures before certain ingredients required in the pastries could be added to make the final dough or batter. A prepared fatty wheat flour which reduces or eliminates these difficulties is disclosed in my United States Letters Patent No. 2,567,815.

It is an object of the present invention to provide an improved process for producing a prepared wheat flour for use in making French crullers, cream puffs and eclairs, whereby the prepared flour not only can be stored and marketed in the form of a ready-to-use powder but is stable against deterioration for a longer period of time than my prior prepared flour, and whereby it possesses a wider field of usefulness in the hands of bakers.

Another object of this invention is to increase the capacity of the prepared flour for holding water so that a higher ratio of water to flour may be used in bringing the flour to a suitable consistency for frying and baking, thereby increasing the batter yield from a unit amount of flour.

In accordance with the present invention, it has been found that a dough or batter composition suitable for making French crullers, eclairs and cream puffs and containing a gelatinized wheat flour with a shortening, eggs, milk or water and perhaps other desired ingredients, can be produced satisfactorily not only when the flour and shortening are precooked together in water, as in prior practices, but also by first precooking the wheat flour in water in the absence of the shortening, then drying and comminuting the precooked and gelatinized flour, and later incorporating it with the required shortening and other ingredients. I have found that such a precooked and dried wheat flour can be blended with the shortening and other ingredients to obtain a dough or batter of the character required, without necessitating any further precooking of the flour with the shortening on the part of the baker, housewife or other person using this flour.

Accordingly, by the method of this invention, wheat flour is first cooked in water in the absence of shortening until the flour is gelatinized, whereupon the precooked flour is dried and comminuted to obtain a fine powdery stable flour which can be packaged and stored for use in homes and bakeries. Dough or batter may then be prepared by simply adding and mixing the shortening and thereafter adding eggs, any other desired ingredients and the necessary amount of milk or water to bring the batter or dough to a consistency suitable for baking or frying. By the omission of shortening from the precooking stage, complexities otherwise encountered in preparing the precooked flour are avoided, the keeping quality of the prepared flour is enhanced, and at the same time the prepared flour is given a wider usefulness since users of the prepared flour are afforded a wider choice in the selection of the shortening and other ingredients to be incorporated with the product.

It has been further found that by drying the gelatinized flour or paste of the first or precooking operation by the technique of drum drying, the resulting powdery flour has a much greater affinity for or capacity to hold water than it has when prepared by other drying techniques. For example, such precooked flours dried by spray drying techniques have shown a capacity to absorb not more than about 1.3 times their weight of water, whereas the comparable products prepared by drum drying can absorb or hold as much as twice their weight of water. This increased capacity gives an important advantage, since a given quantity of the drum-dried flour produces a much higher yield of dough or batter, without any increase in cost.

As an example of my invention, pastry flour may be prepared in the following manner: Slowly add 1 lb. of wheat flour to 1 qt. of water that has been previously brought to a boil. The mixture should be stirred as the flour is added and stirring is continued until the flour gelatinizes. The resulting paste may be thinned by the addition of more water, either warm or cold, until the gelatinized substance runs freely for dry spraying or drum drying. Other ways of drying may be used. The gelatinized substance may then be cooled and is preferably dried and reduced to a fine powder by drum drying. At this stage the product is in a suitable state for packaging and storage and may be distributed in this state to prospective users. A batter and dough may then be prepared from this powder by adding approximately 6 ozs. of shortening, preferably hot or flowing shortening, and subsequently adding eggs, and other products if desired, in quantities selected by the baker himself. Milk or water may be added to bring the mixture to an appropriate consistency for frying or baking.

It will be understood that the foregoing example has been given for illustrative purposes and that this invention is not limited to the details of the description since various modifications may be made in the particular compositions, proportions and particular modes of carrying the invention into effect without departing from the spirit and scope of the claim.

What is claimed is:

A method of preparing pastries such as French crullers, cream puffs and eclairs, which comprises cooking a major proportion of wheat flour in the absence of shortening until the flour is gelatinized, dehydrating and comminuting the product to provide a stable, dry powdery flour, adding and mixing a minor proportion of shortening, and thereafter adding eggs and an aqueous fluid to bring the mixture to a suitable consistency for cooking.

References Cited in the file of this patent

UNITED STATES PATENTS

| Number | Name | Date |
| --- | --- | --- |
| 2,559,022 | Lolkema | July 3, 1951 |
| 2,567,815 | Kipnis | Sept. 11, 1951 |

OTHER REFERENCES

Lord, Everybody's Cook Book, 1924, page 607.